United States Patent
Mansfield et al.

(10) Patent No.: US 11,930,053 B2
(45) Date of Patent: Mar. 12, 2024

(54) CHIRP SIGNAL FILTERING FOR DIGITAL GATEWAY

(71) Applicant: Cubic Corporation, San Diego, CA (US)

(72) Inventors: Stephen J. Mansfield, Alton (GB); Neal F. Nystrom, Potomac Falls, VA (US)

(73) Assignee: Cubic Corporation, San Diego, CA (US)

(*) Notice: Subject to any disclaimer, the term of this patent is extended or adjusted under 35 U.S.C. 154(b) by 496 days.

(21) Appl. No.: 17/142,955

(22) Filed: Jan. 6, 2021

(65) Prior Publication Data

US 2021/0211474 A1   Jul. 8, 2021

Related U.S. Application Data (60) Provisional application No. 62/957,399, filed on Jan. 6, 2020.

(51) Int. Cl.
| | |
|---|---|
| *H04L 65/1104* | (2022.01) |
| *H04L 65/1023* | (2022.01) |
| *H04L 65/1033* | (2022.01) |
| *H04L 65/1069* | (2022.01) |
| *H04W 88/16* | (2009.01) |

(52) U.S. Cl.
CPC ........ *H04L 65/1104* (2022.05); *H04L 65/103* (2013.01); *H04L 65/104* (2013.01); *H04L 65/1069* (2013.01); *H04W 88/16* (2013.01)

(58) Field of Classification Search
CPC .  H04L 65/1104; H04L 65/103; H04L 65/104; H04L 65/1069; H04W 88/16
See application file for complete search history.

(56) References Cited

U.S. PATENT DOCUMENTS

| | | | | |
|---|---|---|---|---|
| 6,563,804 | B1* | 5/2003 | Iyer | H04L 5/16 370/296 |
| 8,374,292 | B2* | 2/2013 | Peach | H04B 7/18513 375/150 |
| 9,923,998 | B1* | 3/2018 | Ryu | H04B 1/709 |
| 10,853,791 | B1* | 12/2020 | Ellis | G06Q 20/325 |
| 2002/0084902 | A1* | 7/2002 | Zadrozny | A61B 5/1123 340/573.1 |
| 2004/0032861 | A1* | 2/2004 | Lee | H04M 1/738 370/352 |
| 2005/0113703 | A1* | 5/2005 | Farringdon | A61B 5/021 600/509 |
| 2005/0272407 | A1* | 12/2005 | Kayamori | H04M 19/041 455/567 |
| 2006/0084476 | A1 | 4/2006 | Serbin et al. | |
| 2006/0088120 | A1* | 4/2006 | Hansen | H04B 7/0613 375/267 |

(Continued)

Primary Examiner — Khaled M Kassim
(74) Attorney, Agent, or Firm — MUGHAL GAUDRY & FRANKLIN PC (57) ABSTRACT

A system and method for filtering chirp noise as it passes through a Radio over Internet Protocol (RoIP) gateway in a communication network is disclosed. Radio signals often include a short burst of chirp noise. Incoming signals are buffered and any chirp noise is detected. A chirp filter performs the filtering operation to remove chirp signal while ensuring true audio is not clipped. Without audio clipping the integrity of the audio signals are preserved.

12 Claims, 5 Drawing Sheets

(56) References Cited

U.S. PATENT DOCUMENTS

| | | | |
|---|---|---|---|
| 2006/0106852 A1* | 5/2006 | Siddall | G06F 16/113 |
| 2007/0281672 A1 | 12/2007 | Backstrom et al. | |
| 2012/0201173 A1* | 8/2012 | Jain | H04B 1/56 |
| | | | 370/277 |
| 2012/0245439 A1* | 9/2012 | Andre | A61B 5/0022 |
| | | | 600/595 |
| 2013/0053058 A1* | 2/2013 | Li | H04H 20/24 |
| | | | 455/230 |
| 2014/0081631 A1* | 3/2014 | Zhu | G10L 21/0208 |
| | | | 704/226 |
| 2014/0179327 A1 | 6/2014 | Uwamori et al. | |
| 2015/0068069 A1* | 3/2015 | Tran | A43B 13/183 |
| | | | 340/693.1 |
| 2017/0230556 A1* | 8/2017 | Bormet | G06T 7/35 |
| 2018/0076842 A1* | 3/2018 | Rubens | H04M 1/2535 |
| 2019/0342593 A1* | 11/2019 | Soltanpur | H04N 21/6168 |
| 2020/0401365 A1* | 12/2020 | Wilberding | G06F 3/162 |
| 2022/0196790 A1* | 6/2022 | Ottosson | G01S 7/021 |

* cited by examiner

CHIRP SIGNAL FILTERING FOR DIGITAL GATEWAY

This application claims the benefit of and is a non-provisional of co-pending U.S. Provisional Application Ser. No. 62/957,399 filed on Jan. 6, 2020, which is hereby expressly incorporated by reference in its entirety for all purposes.

BACKGROUND

Chirp is a noise signal where frequency increases or decreases with time typically caused by an anomalous spike in radio frequency (RF) energy. As used herein, "chirp signal" and similar terms are meant to describe these short bursts of signal, which are undesired and often unintentional. On the other hand, "true audio" and similar terms are meant to describe audio signals (frequently voice) that persist longer than chirp signals. Chirp falls under the category of non-stationary noise having complicated pattern. In radios, chirp is typically at the beginning of a radio grabbing the floor, but is not followed by any audio communication. Chirp or other anomalies can also happen at other times during radio transmission. Further, chirps are mono-component signals modulated in both amplitude and frequency, where their instantaneous frequency is related to the local oscillations of the phase.

Radio over Internet Protocol (RoIP) extends radio coverage to reach greater distance when communicating with wireless networks and internet. A RoIP gateway can couple together digital communication networks with analog or digital radio networks. RoIP can eliminate repeater links between incompatible and/or distant radio networks. Remote access to radio networks across different geographical regions in addition to cross linking conventional analog radios with trunking systems are possible.

SUMMARY

In one embodiment, the present disclosure provides a system and method for filtering chirp noise as it passes through a Radio over Internet Protocol (RoIP) gateway in a communication network. Radio signals often include a short burst of chirp noise that grabs the floor, but doesn't convey any useful audio signal. Incoming signals are buffered and any chirp noise is detected. A chirp filter performs the filtering operation to remove chirp signal while ensuring true audio is not clipped. Without audio clipping the integrity of the audio signals are preserved.

In another embodiment, a radio over Internet Protocol (RoIP) gateway for communicatively coupling one or more radio networks and one or more digital networks together is disclosed. The RoIP gateway includes a transceiver, a processing unit and a communication interface. The transceiver accepts incoming signals from a radio network. The processing unit is coupled with the transceiver to process the incoming signals. The processing unit includes a signal converter, a signal detector, a buffer unit, and a chirp detector. The signal converter for converts the incoming signals from the radio network into digital signals. The signal detector to processes the digital signals to filter away radio network inactivity. The buffer unit stores the digital signals. The chirp detector to determines whether the digital signals in the buffer unit include chirp noise. The chirp filter is coupled to the buffer unit to filter chirp noise from the digital signals. The communication interface for passing the digital signals free of chirp noise to a digital network.

In yet another embodiment, a method of chirp signal filtering in a RoIP system at a first device is disclosed. In one step, a signal is detected at an audio interface of the first device. At least a portion of the signal is buffered by the first device responsive to detecting the signal. Whether the signal is detected at the audio interface for a threshold duration is determined. Either: responsive to determining the signal is detected at the audio interface for the threshold duration, causing the first device to forward the signal, including the at least the portion of the signal that is buffered, to a second device of the RoIP system; or, responsive to determining the signal is not detected at the audio interface for the threshold duration, discarding the at least the portion of the signal that is buffered.

In still another embodiment, a method of chirp filtering for a RoIP gateway that communicatively couples one or more radio networks and one or more digital networks together. In one step, incoming signals are accepted from a radio network before processing the incoming signals. The incoming signals are converted from the radio network into digital signals. The digital signals are processed to filter away radio network inactivity. The digital signals are stored in a memory. It is determined whether the digital signals in the memory include chirp noise. When chirp noise is determined, chirp noise is filtered from the digital signals, before passing the digital signals free of chirp noise to a digital network.

In the appended figures, similar components and/or features may have the same reference label. Where the reference label is used in the specification, the description is applicable to any one of the similar components having the same reference label.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departure from the spirit and scope as set forth in the appended claims.

Embodiments of the invention(s) described herein are generally related to a system and method of eliminating short bursts of nuisance audio (i.e., chirp) in a Radio-over-IP (RoIP) or other radio relay environment. In a RoIP or other radio relay environment, the receipt of brief bursts of noise can result in the remote radio being keyed. This can be caused by radio frequency interference or surges in radio frequency levels. As a result the remote radio (or other communication device) user is disturbed by a "chirp" of noise.

Embodiments of the invention(s) described herein are directed toward eliminating resulting short bursts of signal information without clipping the start of longer audio signals. To do so, embodiments may delay the forwarding of audio to the remote party until the audio has persisted for threshold duration, which may be configurable. This can prevent the transmission of chirp signal to the remote radio or other audio device until it has been confirmed as being true (non-chirp) audio. Once the presence of true audio has been confirmed, then all audio can be forwarded—including the initial audio to ensure that the start of the audio-burst is not lost. That is, in telecomm terminology, this can ensure that audio clipping does not occur. If audio does not persist for threshold duration, then the audio is discarded and the remote party hears nothing.

Figure 1:
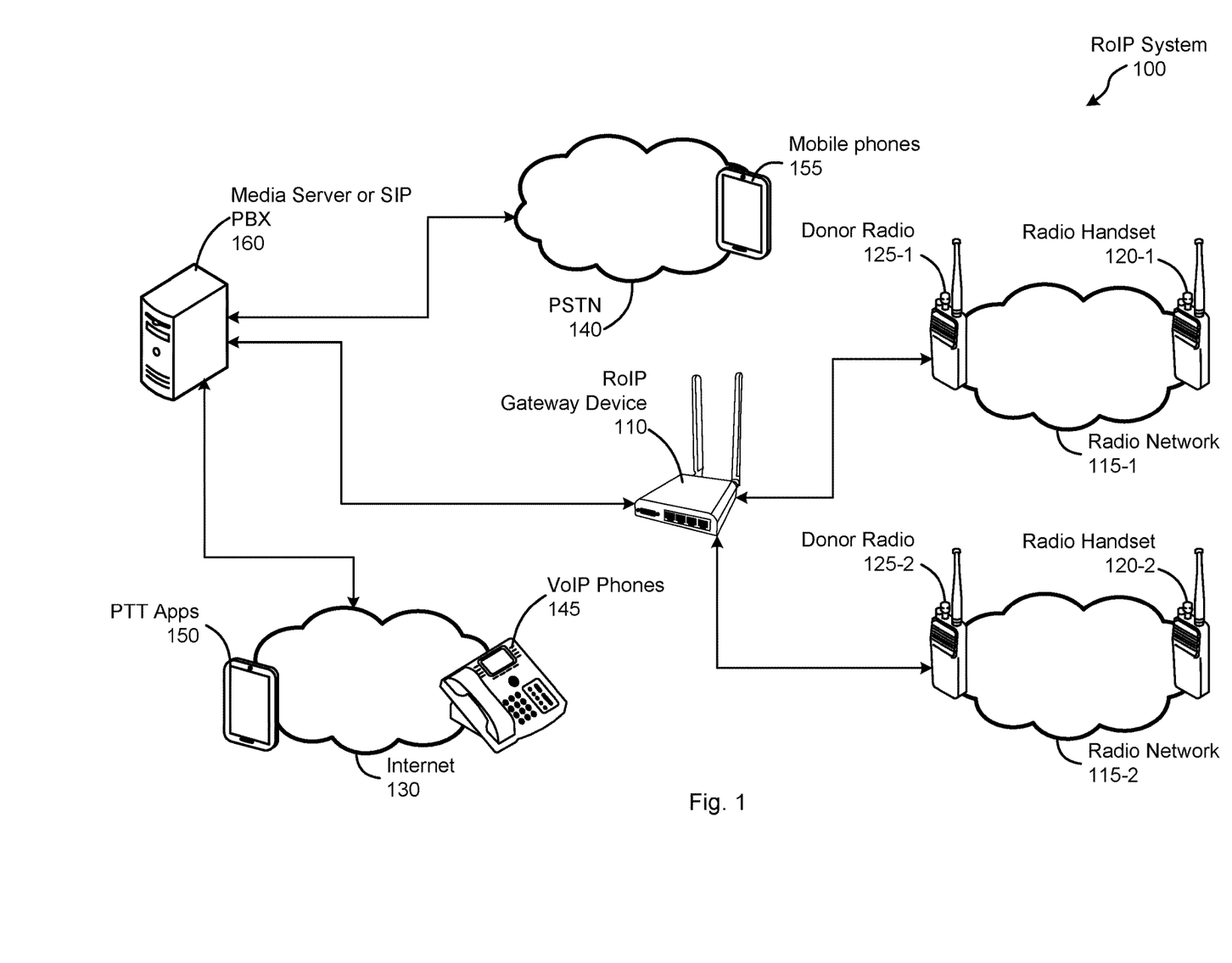
FIG. 1 depicts a simplified diagram of a RoIP system.

FIG. 1 illustrates a RoIP system 100, according to an embodiment of the present disclosure. The RoIP system 100, two different radio networks 115-1, 115-2 are communicatively coupled with a RoIP gateway 110. In order to communicate with each radio networks 115 the RoIP gateway 110 uses donor radios 125 that can communicate with radio handsets 120 for their respective radio network 115 as well as with the RoIP gateway device 110. The RoIP system 100 includes one or more first radio handsets 120-1 operating on a specific radio technology is coupled with a first donor radio 125-1 through a first radio network 115-1. Similarly, one or more second radio handsets 120-2 may be operating on another radio technology or different location is coupled with a second donor radio 125-2 through a second radio network 115-2. Each donor radio 125 is communicatively coupled with the RoIP gateway 110 via a respective one radio port of the RoIP gateway 110 to allow interface to the respective radio network 115.

The RoIP gateway 110 enables the first radio handset 120-1 and the second radio handset 120-2 to communicate further with the wider communication network that can be geographically separated or technologically separated. The first radio handset 120-1 and the second radio handset 120-2 may be operating on different radio technologies, protocols and/or encryption such that they may not be able to communicate directly with each other. However, RoIP gateway 110 can relay communications between different radio networks 115. In such a scenario, the RoIP gateway 110 acts as a bridge, communicatively coupling different radio networks 115. Each radio network 115 may comprise any number of radio handsets 120, configured to communicate with each other via wireless radio frequency (RF) signals. Depending on the capacity of the RoIP gateway 110, more radio networks 115 may also be communicatively coupled with the RoIP system 100. This approach provides a flexible architecture to construct a scalable RoIP system 100. RoIP gateway 110 accepts the input signals from the radio handset 120-1 and 120-2 which may include chirp noise originating from any point of source either in analog or digital form.

The RoIP gateway device 110 operates to bridge communications between various different endpoints of the RoIP system 100. Arrows connect various components, which may be implemented using any variety of communication technologies ranging from wired and/or wireless communication technologies, an optical fiber network, a laser point-to-point, optical line of sight links using various protocols/ standards. The RoIP system 100 may have more or fewer communication devices, including any number of radios (e.g., donor radios 125 and/or radio handsets 120), mobile phones 155, VoIP phones 145, push-to-talk (PTT) apps 150, and/or other connected devices. Radio handsets 120 may comprise land mobile radio (LMR) handsets. PTT functionality could use carrier operated relay (COR) PTT functionality. The radio networks operate in a half-duplex mode, but could support full-duplex radios.

The RoIP gateway 110 is communicatively coupled with digital communication networks via media server or session initiation protocol (SIP) private branch exchange (PBX) 160. Communications between the RoIP gateway 110 and the media server/PBX 160 may use RTP protocol to carry voice payload, with or without accompanying SIP signaling. The media server 160 is communicatively coupled with mobile phones 155 via public switched telephone network (PSTN) 140 and with VoIP phones 145 and PTT applications 150 via the Internet 130. In addition to SIP, the media server supports communication using hypertext transport protocol (HTTP), transmission control protocol/internet protocol (TCP/IP), and/or asynchronous transfer mode (ATM) protocols.

The RoIP gateway 110 enables radio handsets 120 to engage in audio communications with VoIP phones 145, mobile phones 155 and/or other digital communication devices. Multiple RoIP gateways 110 are possible. The RoIP gateway 110 may allow radio handsets 120 to communicate with remote radio networks coupled with another remote RoIP gateway 110 communicatively coupled with the Internet 130. As such, digital and radio handsets are allowed to communicate with devices outside their respective digital and radio networks. The RoIP system 100 may include additional networks and some RoIP systems may include other RoIP gateways remote from the RoIP gateway 110, allowing other types of networks to communicate over the RoIP system 100. In military applications, for example, other gateways may enable packet-based communication over a serial interface.

Chirp signals may be relayed through the RoIP system 100 by the RoIP gateway 110 and other endpoints in the RoIP system 100 configured to receive and forward audio. False detection of an audio signal may result in a SIP or other call being initiated by the media server/PBX 160. Initiation of the call is delayed until the audio has been confirmed as being true audio and not chirp signal.

In an embodiment, the RoIP gateway 110 may comprise a transceiver with which it communicates to a particular donor radio 125-1. If the RoIP gateway 110 receives a signal on the transceiver 204 used to communicate with donor radio 125-1, the RoIP gateway 110 may digitize and forward the signal to the mobile device executing PTT apps 150, via the media server or SIP PBX 160 and internet 130. If the signal received by the RoIP gateway 110 at the transceiver is a short audio burst from the donor radio 125-1, or even a spike in amplitude due to non-audio energy (noise), it will be digitized and forwarded to the PTT apps 150, resulting in an indication of audio beep with no accompanying true audio. Thus, the propagation of these chirp signals throughout the RoIP system 100 can be a nuisance to many communication devices within the RoIP system 100, negatively impacting user experience and reducing the overall effectiveness of communications within the RoIP system 100. These sudden burst in a signal chirp noise may be generated at any communication devices in the RoIP system 100 and typically by analog radio handsets 120. Chirp filtering process can eliminate these noise signals received at the RoIP gateway device 110.

Figure 2:
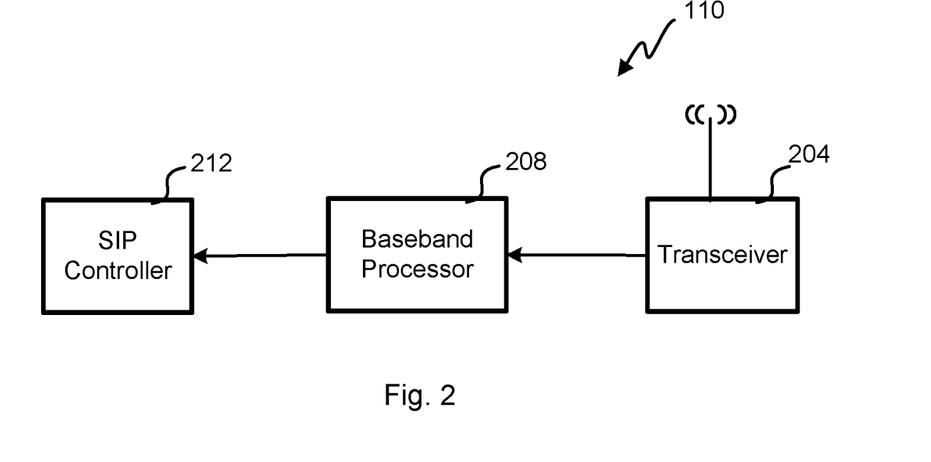
FIG. 2 depicts a block diagram of RoIP gateway.

FIG. 2 illustrates one embodiment of the RoIP gateway 110 that bridges the radio and digital networks. At one side, a transceiver 204 receives/transmits radio signals of the donor radios 125. On the other side, signals received/sent with the digital networks are processed by a SIP controller 212 for the SIP PBX 160. The transceiver 204 is communicatively coupled to a baseband processor 208, which digitally processes the signals which may include the chirp noise generated at any communication devices of the RoIP network 100. Further, baseband processor 208 is communicatively coupled to a SIP controller 212 which in turn is coupled with the digital networks via SIP PBX 160 to communicatively couple the radio network with one or more digital networks.

The baseband processor 208 can buffer a signal received at the audio interface and, if the signal has persisted for threshold duration, forward the true signal to the SIP controller 212. Otherwise, the baseband processor 208 can discard the signal as chirp signal. The SIP controller 212 sends/receives communication for the SIP PBX 160.

COR signaling can be used to indicate when true audio is being communicated via an audio channel (e.g., an analog audio interface of the RoIP gateway device 110) to filter out chirp signals for radio networks 115 that support COR. For radio handsets 120 without COR signaling, the chirp can be filtered.

When the analog audio interface of the RoIP gateway 110 is being operated in a "voice activity detection" (audio detection) mode, in which the RoIP gateway device 110 forwards audio detected at the donor radio, via the analog audio interface. Operation of the RoIP gateway 110 in the voice activity detection mode may be based on user preferences, capabilities of the donor radio 125, and/or other factors.

Figure 3:
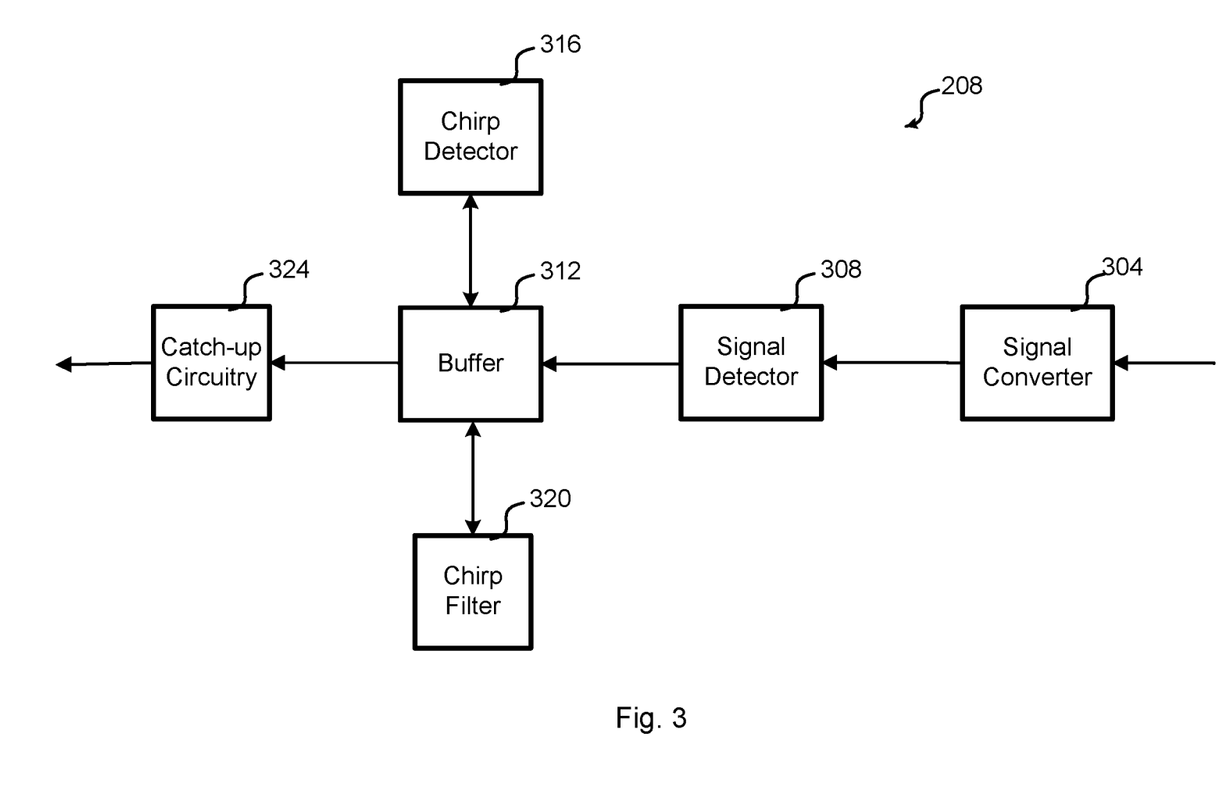
FIG. 3 depicts a block diagram of chirp filter circuitry within RoIP gateway.

FIG. 3 illustrates a baseband processor 208 for processing the true audio and chirp signals along with noise received from the transceiver 204 in one embodiment. A signal converter 304 accepts the output signals of the transceiver 204. Signal converter 304 converts the input signals received from the transceiver 204 into digital form using an analog to digital converter (ADC). The signal converter 304 is communicatively coupled with a signal detector 308 to identify whether the output signals from the signal converter 304 includes any active signal from the radio network (i.e., active signal could include chirp signal or true audio) or just noise that would be removed.

The signal detector 308 is communicatively coupled with a buffer 312 that stores digital signal, for example, in a first in/first out (FIFO) configuration where an input pointer places digital samples into the buffer and an output pointer indicates the next digital sample to remove from the buffer 312. Generally, the input pointer and output pointer move through the buffer 312 synchronously to output digital signal as fast as it is input.

The buffer 312 is coupled with a chirp detector 316 to ascertain whether the buffered signals include any chirp noise or other sudden burst component in the digital signals. In this embodiment, chirp signal is detected when the buffer 312 only fills to a given threshold before the radio signal releases the floor. For example, a 200 ms or less digital signal is flushed from the buffer 312 upon recognition by the chirp detector of the chirp signal. A chirp filter 320 flushes the buffer by incrementing the output pointer by the length of the digital signal that is less than the threshold. For example, a 50 ms RF burst of energy might fill the buffer 312 by incrementing the input pointer with each sample for the digital signal before releasing the channel by a radio handset 120. The output pointer runs a maximum of 200 ms in buffer delay. Once the threshold is not met, the chirp filter 312 increments the output pointer over the 50 ms RF burst to effectively erase it so that it is not coupled to the SIP controller 212.

The chirp duration threshold can be other values in different embodiments, for example 10 ms, 25 ms, 50 ms, 75 ms, 100 ms, 150 ms, 250 ms, 300 ms, or more. For different radio handsets 120 or radio networks 115, a different threshold could be used, for example, the first radio network 115-1 could have a 150 ms threshold and the second radio network 115-2 could have a 250 ms threshold. Other embodiments could interrogate the buffer 312 with the chirp detector 316 using machine learning and/or artificial intelligence algorithms to more quickly or definitively identify chirp signal or other sudden burst components that are not true audio. Different specific radios may have repeating patterns of chirp signal that could also be recognized by the chirp detector by keeping individual profiles on each radio, model of radio, radio type, etc.

The buffer 312 along with other digital processing of the baseband processor 208 introduces delay or latency. For example, a 200 ms chirp threshold results in that same amount of additional delay through the baseband processor 208. The latency produces a lag in communication that can make it awkward for those that might respond. Optionally, this embodiment uses catch-up circuitry to reduce that delay during a given radio communication. The catch up circuitry 324 speeds-up the signal spooled from the buffer to overcome any delay added during chirp filtering. For example, a 10 second true audio transmission may start with 200 ms of buffer delay that results in the first 5 seconds being spooled out quicker such that the remaining 5 second true audio has no buffer delay. Sped-up signal can distort the true audio and the catch-up circuitry 324 can auto-tune the pitch back closer to the true audio.

Although this embodiment uses a circular buffer that allows skipping digital signal by manipulation of the output pointer, other embodiments could use a micro controller to perform the filtering and catch-up without a dedicated buffer in other embodiments. Digital signal could be stored in standard memory for chirp detection/filtering and catch-up. Additionally, the microcontroller could perform other filtering, signal encryption and digital encoding. Some microcontrollers also contain ADC circuitry and other functions in a single-chip baseband processor.

Figure 4:
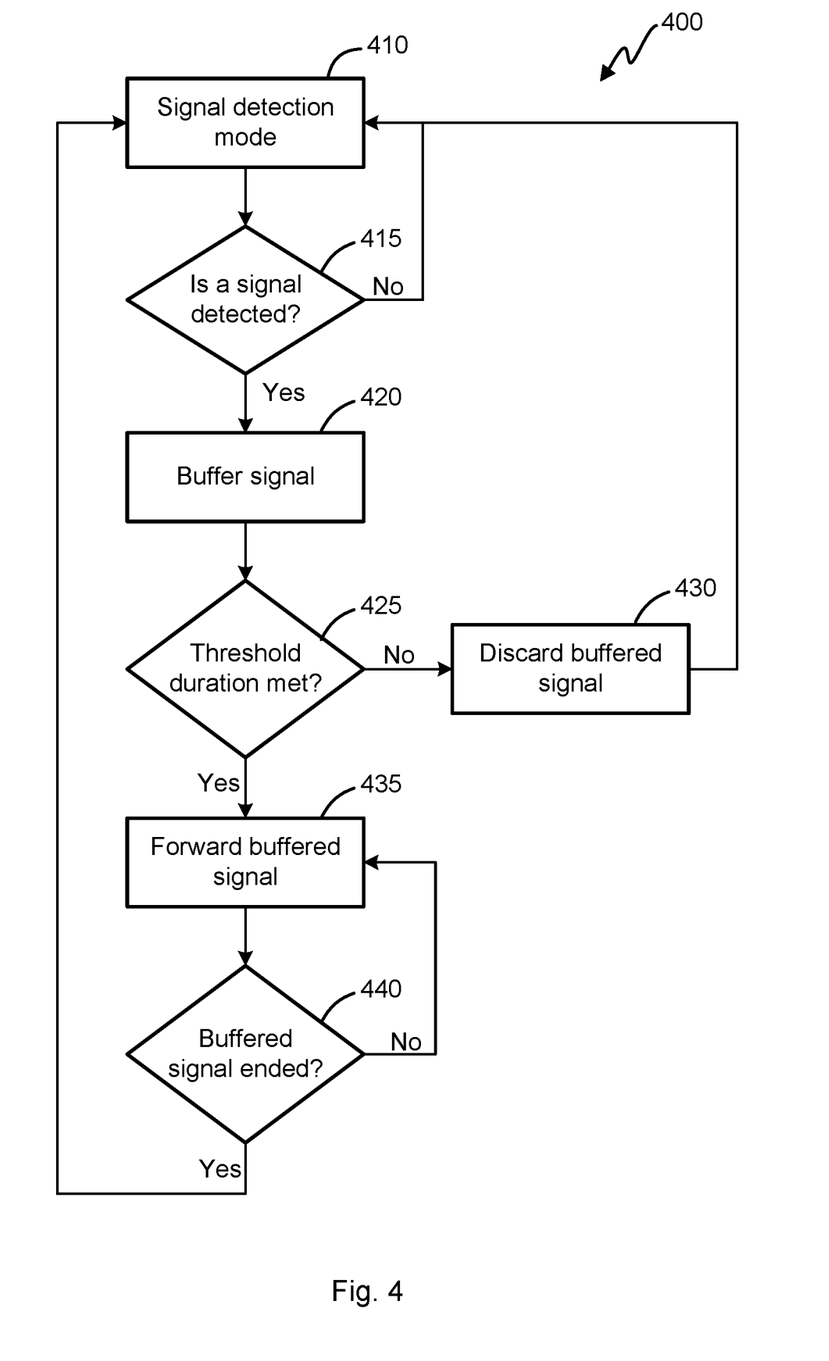
FIG. 4 depicts a flow-chart of buffer signal and threshold value.

FIG. 4 is a flow diagram illustrating the functions a RoIP gateway device 110 may perform for chirp signal filtering, according to an embodiment. The RoIP gateway 110 may perform the illustrated functions for each digital or radio interface that receives digital signal for communication across the RoIP system 100.

The method may begin at block 410, where the RoIP gateway device 110 operates in a signal detection mode performed by the signal detector 308. In some embodiments, the RoIP gateway device 110 may simply monitor incoming signal from a donor radio 125 to determine if it contains signals having amplitude above a certain threshold level of audio. Incoming signals made not be due solely to incoming true audio from an attached donor radio 125, but may be due to interference, for example, chirp signal. Once a digital signal is detected above the threshold level by the baseband processor 208, it is stored in the buffer 312, as indicated at block 420.

The detection of a signal can vary, depending on desired functionality. In some embodiments, the incoming analog signal information from the analog audio interface can be converted to digital data using an ADC, packetized into data packets, and sent to a signal detector 308 (e.g., a microcontroller or microprocessor) to determine whether a digital signal is present. In some embodiments, for example, each data packet includes signal information for 20 ms of incoming signal. (At a sample rate of 16 kHz, for instance, each data packet would include 320 samples of signal data.) Alternative embodiments may have data packets containing larger or smaller amounts of audio data—including different sampling rates (larger or smaller than 16 kHz) and/or different durations of audio data (larger or smaller than 20 ms in length). According to some embodiments, the determination of whether a signal is present in the data packet may comprise determining whether a threshold number of samples (e.g., one or more) of signal data, and/or a mean or average value of samples of signal data have an amplitude greater than a threshold amount (e.g., 0 or greater, but this may be dependent on sampling bit depth).

In some embodiments, a determination of whether a signal is detected may further comprise the determination of whether a specific type of signal (e.g., voice) is detected. For example, in some embodiments, the information in each data packet may be analyzed to determine whether a voice-range frequency (e.g., a frequency within the range of 300 to 3400 kHz) is detected by the signal detector 308 and/or chirp detector 316.

The filtering of chirp signals can be implemented by determining whether the detected signal has met a duration threshold. That is, as shown at block 425, embodiments may determine whether to forward the buffered signal data if the detected signal being buffered has met a threshold length of time. The threshold duration may vary, depending on desired functionality. Moreover, this threshold duration may be configurable by an operator of the RoIP gateway device 110.

Generally speaking, the threshold duration may be configured as a minimum amount of time for a true audio signal, which may be on the order of tens of milliseconds, for example. That said, in some applications, a user may want to set a relatively long threshold duration (e.g., 100 ms or more). Accordingly, embodiments of a RoIP gateway device 110 may utilize a memory with sufficient capacity to provide for such relatively long threshold durations at the sample rate for the digital signal.

In embodiments in which signal data is packetized, the configurability of the threshold duration may be a function of data packet length. More specifically, the threshold duration may be N×packet length, where N is the number of successive data packets in which a signal is detected. In the example where each data packet includes 20 ms of signal data, for example, the threshold duration may be in multiples of 20 ms (20, 40, 60, 80, or 100 ms, or more). Again, this threshold may be set by an operator of the RoIP gateway device 110.

If the signal does not last the threshold duration (e.g., signal is not detected for N successive data packets), the buffered signal can then be discarded, at block 430, by the chirp filter and the RoIP gateway device 110 can again enter the signal detection mode at block 410.

On the other hand, if the signal meets the threshold duration, the RoIP gateway device 110 can then forward the buffered signal 435 to the SIP controller 212. Here, the RoIP gateway device 110 can prevent audio clipping by continually buffering incoming audio detected at the analog audio interface and forwarding the buffered audio, as shown at block 440. Thus, the forwarded audio signal may have any length, and may be delayed only by the length of the threshold duration. Because the threshold duration may be only a fraction of a second, this delay in audio forwarding may be insignificant (and even undetectable by users).

In some embodiments, the value of the threshold duration may be automatically adjusted over time, to accommodate the particular audio (and/or RF) environment of the donor radio 125 and the radio network 115 from which the donor radio 125 receives audio communication, and changes thereto. In some embodiments, the value of the threshold duration may be given an initial value (e.g., a default setting set by the manufacturer or a value selected by a RoIP gateway device operator) when the donor radio 125 is first connected with the RoIP gateway device 110. Over time, the RoIP gateway device 110 can optimize this value by automatically "tuning" it based on an analysis of signal data. Different specific radios, radio types, radio networks, may have different threshold durations that are different.

For example, the value of the threshold duration may be given an initial value of 100 ms (relatively long to increase the amount of chirp signal filtering). However, after analyzing discarded buffered signal data (e.g., in real time, over the course of a period of time of seconds, minutes, hours, etc.) the RoIP gateway device 110 may identify that discarded buffered signal data rarely (if ever) exceeds 60 ms. (Put differently, if a signal is detected for three 20 ms packets in a row, the signal will virtually always persist for longer than the 100 ms threshold duration.) The RoIP gateway device 110 can then lower the value of the threshold duration to 60 ms to reduce the delay in forwarding the buffered signal while maintaining optimal chirp signal filtering.

On the other hand, the RoIP gateway device 110 may analyze the forwarded signal to determine whether chirp signals are being forwarded (e.g., signals that exceed the threshold duration but do not persist longer than a relatively short time for true audio—such as 100 ms), then the RoIP gateway 110 can increase the value of the threshold duration to increase the amount of chirp signal filtering. Machine learning and artificial intelligence can be used to increase or decrease the threshold(s) over time for the various radios, latencies, circuit variations, time lags due to geographies, etc.

By analyzing signal data on an ongoing basis to determine whether the value of the threshold duration should be increased or decreased, the RoIP gateway device 110 can ensure the threshold duration value remains optimized despite changes in the audio and/or RF environment over time. As noted, an operator of the RoIP gateway 110 may choose to enable or disable automatic adjustment of the value of the threshold duration. Moreover, in some embodiments, the amount of data analyzed by the RoIP gateway 110 (e.g., seconds, minutes, hours, etc.) may also be configurable.

Figure 5:
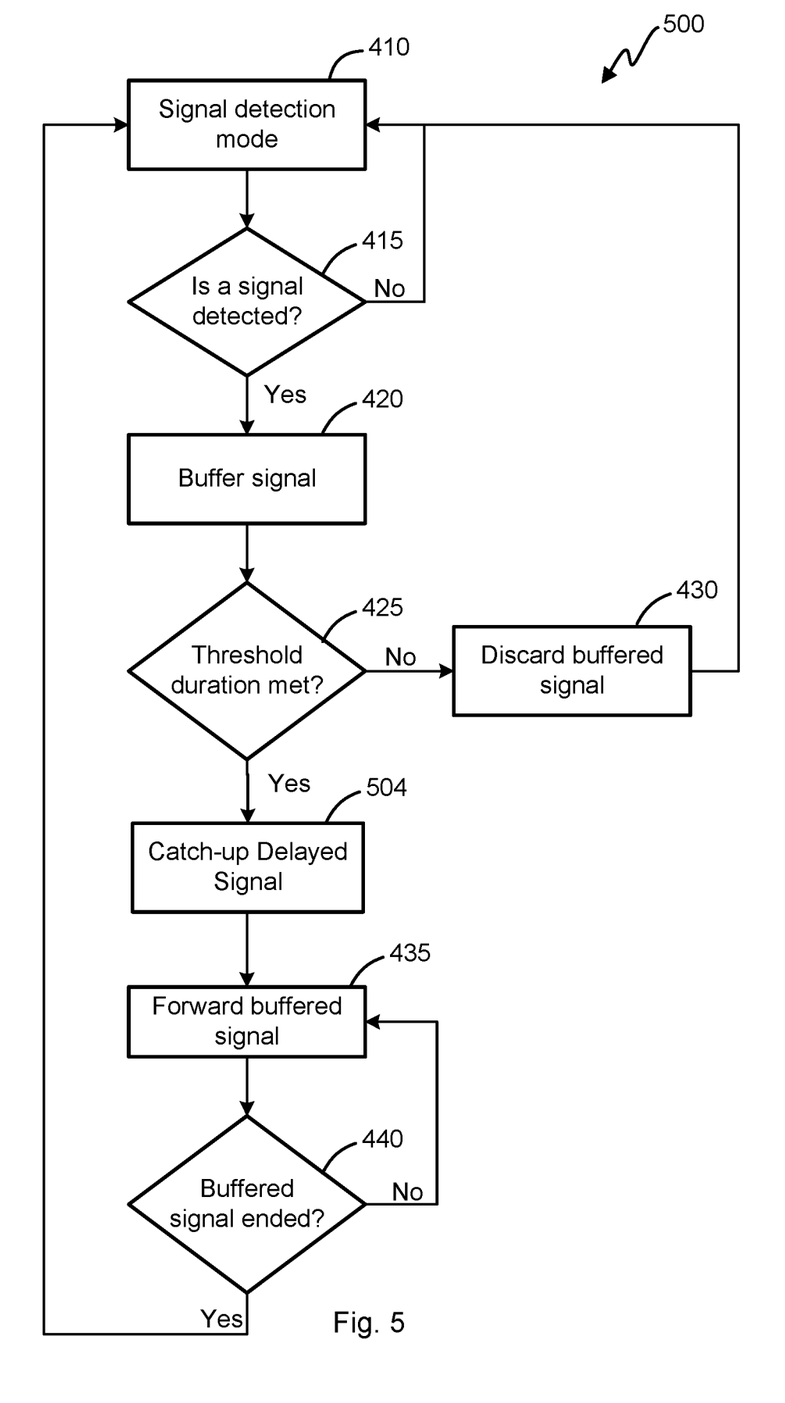
FIG. 5 depicts a flow-chart including buffer signal, threshold value and catch-up function.

FIG. 5 is a flow chart showing another embodiment of how the RoIP gateway 110 functions to remove chirp signal in favor of true audio with catch-up circuitry to speed-up the digital signal when there is true audio. In comparison with FIG. 4, a block 504 is added between blocks 425 and 435 that performs the accelerated playback of the catch-up circuitry 324. This could be as simple as incrementing the output pointer of the buffer 312 more quickly or dropping some digital samples altogether. Or, more sophisticated algorithms for speeding playback of audio without introducing distortion could be used.

A number of variations and modifications of the disclosed embodiments can also be used. For example, chirp typically comes from the analog radios, but in some embodiments chirp can come from the digital handsets. Similar chirp filtering can be used for the signals that originate from the digital networks in the RoIP gateway.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A radio over Internet Protocol (RoIP) gateway for communicatively coupling one or more radio networks and one or more digital networks together, the RoIP gateway comprising:
    a transceiver to accept incoming signals from a radio network;
    a processing unit coupled with the transceiver to process the incoming signals, the processing unit comprising:
        a signal converter for converting the incoming signals from the radio network into digital signals,
        a signal detector to process the digital signals to filter away radio network inactivity,
        a buffer unit for storing the digital signals,
        a chirp detector to determine whether the digital signals in the buffer unit include chirp noise, and
        a chirp filter coupled to the buffer unit to filter chirp noise from the digital signals; and
    a communication interface for passing the digital signals that are free of chirp noise to a digital network, wherein the chirp filter avoids clipping digital signals that are free of chirp noise to preserve audio signal integrity.

2. The RoIP gateway for communicatively coupling one or more radio networks and one or more digital networks together as recited in claim 1, wherein the digital network uses Session Initiation Protocol (SIP), Hypertext Transport Protocol (HTTP), Transmission Control Protocol/Internet Protocol (TCP/IP), and/or Asynchronous Transfer Mode (ATM) protocols in a unicast or multicast configuration.

3. The RoIP gateway for communicatively coupling one or more radio networks and one or more digital networks together as recited in claim 1, wherein the transceiver operates in a half-duplex mode.

4. The RoIP gateway for communicatively coupling one or more radio networks and one or more digital networks together as recited in claim 1, wherein the communication interface provides communication with Internet Protocol (IP) enabled apparatus coupled with the communication interface.

5. The RoIP gateway for communicatively coupling one or more radio networks and one or more digital networks together as recited in claim 1, wherein the digital networks comprising one or more of a wired network, an optical fiber network, a laser point-to-point, optical line of sight, a wireless network.

6. The RoIP gateway for communicatively coupling one or more radio networks and one or more digital networks together as recited in claim 1, wherein:
    the transceiver to accepts incoming signals from a second radio network, and
    the radio network and second radio network cannot directly communicate with each other without the RoIP gateway.

7. The RoIP gateway for communicatively coupling one or more radio networks and one or more digital networks together as recited in claim 1, wherein the signal detector only forwards the digital signals that persist for threshold duration.

8. The RoIP gateway for communicatively coupling one or more radio networks and one or more digital networks together as recited in claim 1, wherein the chirp detector communicates with the buffer unit to process the digital signals to detect chirp signal and instruct the chirp filter to filter the chirp signal.

9. The RoIP gateway for communicatively coupling one or more radio networks and one or more digital networks together as recited in claim 1, wherein the processing unit further comprises catch-up circuitry accelerate a read rate of the buffer.

10. A method of chirp filtering for a RoIP gateway that communicatively couples one or more radio networks and one or more digital networks together, the method comprising:
    accepting incoming signals from a radio network;
    processing the incoming signals;
    converting the incoming signals from the radio network into digital signals;
    processing the digital signals to filter away radio network inactivity;
    storing the digital signals in a memory;
    determining whether the digital signals in the memory include chirp noise;
    when chirp noise is determined:
        filtering chirp noise from the digital signals, and
        passing the digital signals free of chirp noise to a digital network,
    wherein the chirp filter avoids clipping digital signals that are free of chirp noise to preserve audio signal integrity.

11. The method of chirp filtering for the RoIP gateway that communicatively couples one or more radio networks and one or more digital networks together as recited in claim 10, the method further comprising accelerating playback of the digital signals after filtering chirp noise whereby delay between real time and the playback is reduced.

12. The method of chirp filtering for the RoIP gateway that communicatively couples one or more radio networks and one or more digital networks together as recited in claim 10, wherein the memory is a circular buffer.

* * * * *